March 30, 1937.  G. H. JAMES  2,075,524
WILDCAT FOR WINDLASSES
Filed March 1, 1935
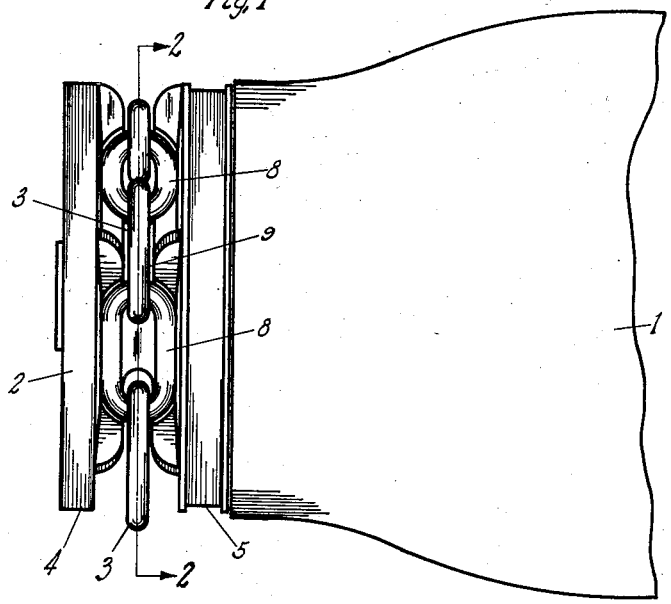
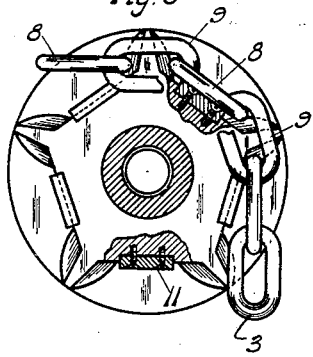
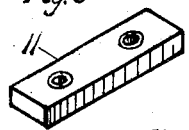
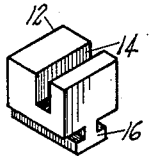 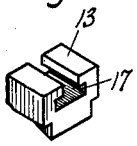
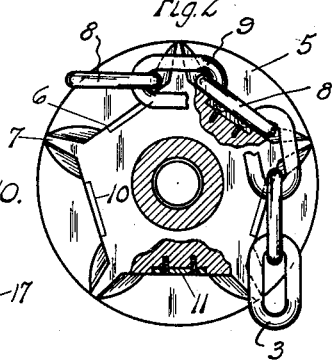
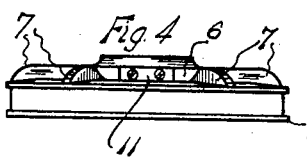
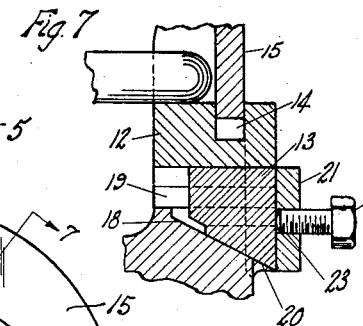
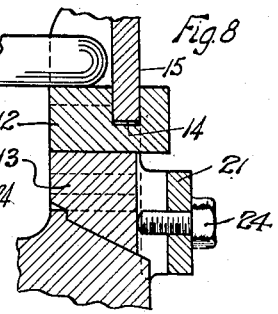
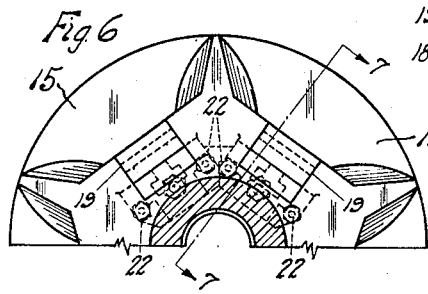
Inventor
George H James
By Carl H Libbe
Attorney Patented Mar. 30, 1937

2,075,524

UNITED STATES PATENT OFFICE 2,075,524

WILDCAT FOR WINDLASSES

George H. James, Philadelphia, Pa., assignor to American Engineering Company, Philadelphia, Pa., a corporation of Pennsylvania Application March 1, 1935, Serial No. 8,832

3 Claims. (Cl. 74—244)

This invention relates to windlasses, marine railway hoisting apparatus and like machines, and more particularly to improvements in wildcats or chain wheels employed on such machines.

Owing to the difficulties encountered in manufacturing chains of the type employed on wildcats or chain wheels, it often happens that irregularities occur in the length of chain links of standard size. When such chains are used on wildcats or chain wheels, designed for that standard size of chain, proper operation thereof is impaired. Such irregularities also occur from corrosion and wear of both the chain and wildcat or chain wheel. In case such irregularities are material the links tend to slip over the lugs of the wildcat and as a result slippage and ineffective operation thereof occurs.

One object of the present invention is to provide an improved wildcat or chain wheel construction which eliminates the above mentioned difficulties.

Another object is to provide a wildcat or chain wheel wherein the pitch diameter thereof may be varied at will.

A further object is to so construct a wildcat or chain wheel that shoes of different thicknesses may be inserted thereon to vary the pitch diameter thereof.

A still further object is to provide a wildcat or chain wheel with adjustable shoes for varying the pitch diameter thereof.

Other and further objects will become apparent as the description progresses.

Of the drawing:

Fig. 1 is a side view of a windlass employing a wildcat or chain wheel.

Fig. 2 is a view taken substantially along line 2—2 of Fig. 1 showing one size of removable shoe associated therewith.

Fig. 3 is a view similar to Fig. 2 showing removable shoes associated therewith of a different size.

Fig. 4 is a plan view of the portion of the wildcat shown in Figs. 2 and 3 with the chain removed therefrom.

Fig. 5 is a perspective view of one of the removable shoes associated with the wildcat.

Fig. 6 is a partial sectional elevational view of a modified construction showing the wildcat provided with adjustable shoes for varying the pitch diameter thereof.

Fig. 7 is a view taken substantially along line 7—7 of Fig. 6, showing an adjustable shoe in one position of adjustment.

Fig. 8 is a similar view showing the adjustable shoe in another position of adjustment, and Figs. 9 and 10 are perspective views respectively of the adjustable shoe and the operating element associated therewith.

Referring to the drawing, the numeral 1 designates generally a windlass or like machine having provided at one end thereof a wildcat 2 over which is trained a chain 3. As shown more particularly in Figs. 2 and 3, the wildcat is provided with two adjacent sections 4 and 5 of substantially pentagonal form, the alternately disposed flat link engaging surfaces 6 and lugs 7 respectively, of each section, being spaced slightly apart and in substantially registering position.

As shown in Fig. 2, each flat 6 is substantially the length of one of the links of the chain. One set of alternately disposed links 8 at times rest on adjacent flats 6, while the links 9 disposed therebetween extend between the lugs 7 separating said flats. Thus, during rotation of the wildcat, the lugs 7 engage the end of the substantially flat links 8 in a well known manner, and the chain, as well as the object carried thereby, may be raised, lowered, or pulled back and forth. Each of the flats 6 is provided with an elongated substantially rectangular depression 10 for receiving a similarly shaped shoe 11. The shoes 11 shown in Fig. 2 neatly fill the depressions 10 so that the outer surfaces thereof are substantially flush with the surfaces 6. Shoes of this thickness are provided when the links of the chain are of proper length. However, in the event the links of the chain should be slightly longer than the proper length for links of that standard size, the shoes 11 may be removed and shoes of a greater thickness substituted in place thereof, as shown in Fig. 3. In this manner, it is seen the pitch diameter of the wildcat or chain wheel may be increased or decreased, so as to best fit the chain.

In Figs. 6 to 9 a somewhat modified construction is shown. Instead of employing rectangular shoes of different sizes an adjustable shoe construction is provided for each of the flat surfaces of the wildcat. This construction comprises an upper link engaging element 12, slidably interlocked with a lower operating element 13. The upper element 12 is provided with an open guide slot 14 which receives the inner end of flange 15 of the wildcat. The lower surface of element 12 has depending therefrom a substantially T-shaped projection 16 which is adapted to enter a similarly shaped slot 17 provided near the upper end of element 13. The bottom wall 18 of each of the pockets 19 which receives the elements 12 and 13, is inclined downwardly and outwardly and engages the correspondingly beveled lower surface 20 of element 13. A strap 21 secured in any suitable manner, such as by bolts 22, to the outer side of each section opposite each flat 6 of the wildcat is provided with a threaded aperture 23 in which operates an adjusting screw 24. It therefore is seen that upon adjustment of screws 24 elements 12 may be raised or lowered, as the case may be, to vary the pitch diameter of the wildcat or chain wheel to compensate for any irregularities in the length of the chain employed.

The present invention has the primary advantage of utilizing wildcats of standard construction to take care of a wide variation in the length of chain links. Without such a construction it is obvious that in order to effectively operate the chain under load, it would be necessary to design an entirely new wildcat for each chain. By employing the present invention, it is only necessary to insert a shoe of proper thickness in place of the original one, or to employ adjustable elements of the type just described if the pitch diameter is to be changed.

Adjustments in the pitch diameter of the wildcat or chain wheel may be made without dismantling any of the parts of the machine or removing the said wildcat or chain wheel from its shaft.

While the embodiments herein shown are admirably adapted to fulfill the objects primarily stated, it is to be understood that it is not intended to limit the invention to these embodiments since it may be embodied in other forms, all coming within the scope of the claims which follow.

What is claimed is:

1. A wildcat or chain wheel, comprising a chain engaging portion of substantially polygonal construction, having alternately disposed flat surfaces and lugs, each of said flat surfaces having an elongated depression therein, and a removable shoe provided in each of said depressions adapted for renewal by shoes of greater or lesser thickness whereby the pitch diameter of said chain engaging portion may be varied.

2. In a windlass or like machine, the combination of a wildcat, comprising a chain engaging portion of substantially polygonal construction, alternately disposed flat surfaces and lugs provided on said chain engaging portion, each of said flat surfaces having an elongated depression therein, and a removable shoe in each of said depressions adapted for renewal by shoes of greater or lesser thickness whereby the pitch diameter of said chain engaging portion may be varied.

3. A wildcat or chain wheel, comprising a pair of interconnected sections, said sections being of substantially polygonal form having alternately disposed flat surfaces and lugs, the flat surfaces and lugs of one section registering respectively with the flat surfaces and lugs of the other section, each of said flat surfaces having an elongated depression therein, and a removable shoe provided in each of said depressions adapted for renewal by shoes of greater or lesser thickness whereby the pitch diameter of said wildcat or chain wheel may be varied.

GEORGE H. JAMES.